United States Patent [19]
Hoadley et al.

[11] 3,754,811
[45] Aug. 28, 1973

[54] PROJECTION SCREEN

[75] Inventors: Harvey O. Hoadley; Robert N. Wolfe; Harold F. Langworthy; James J. Depalma, all of Rochester, N.Y.

[73] Assignee: Eastman Kodak Company, Rochester, N.Y.

[22] Filed: Dec. 13, 1971

[21] Appl. No.: 207,084

[52] U.S. Cl. ............................... 350/127, 350/125
[51] Int. Cl. .......................................... G03b 21/60
[58] Field of Search .............. 350/117–129; 240/106

[56] References Cited
UNITED STATES PATENTS

| | | | |
|---|---|---|---|
| 2,552,455 | 5/1951 | Pond | 350/129 |
| 2,207,835 | 7/1940 | Sckumlyn | 350/117 |
| 2,804,801 | 9/1957 | Mihalakis | 350/129 |
| 2,510,344 | 6/1950 | Law | 350/128 |
| 2,480,031 | 8/1949 | Kellogg | 350/127 |
| 2,279,555 | 4/1942 | Browne et al | 350/127 |
| 1,970,358 | 8/1934 | Bull et al. | 350/127 |
| 2,884,833 | 5/1959 | Pohl | 350/128 |
| 2,870,673 | 1/1959 | Schwesinger | 350/128 |
| 3,257,900 | 6/1966 | Goodbar et al. | 350/129 |
| 2,984,152 | 5/1961 | Mihalakis | 350/129 |

*Primary Examiner*—Samuel S. Matthews
*Assistant Examiner*—Richard M. Sheer
*Attorney*—Robert W. Hampton

[57] ABSTRACT

A highly efficient projection screen of improved aesthetic quality. The screen comprises a plurality of contiguous grooves, each groove having a depth which undulates at a random spatial frequency within a predefined spatial frequency range to define a row of contiguous microelements of random sizes, preferably alternating from concave to convex in shape. Each microelement is contoured to redistribute substantially all of the incident image flux through a predefined audience space in such manner that its luminance, viewed from any point in the audience space, is substantially constant.

19 Claims, 17 Drawing Figures

Patented Aug. 28, 1973 3,754,811
6 Sheets-Sheet 1
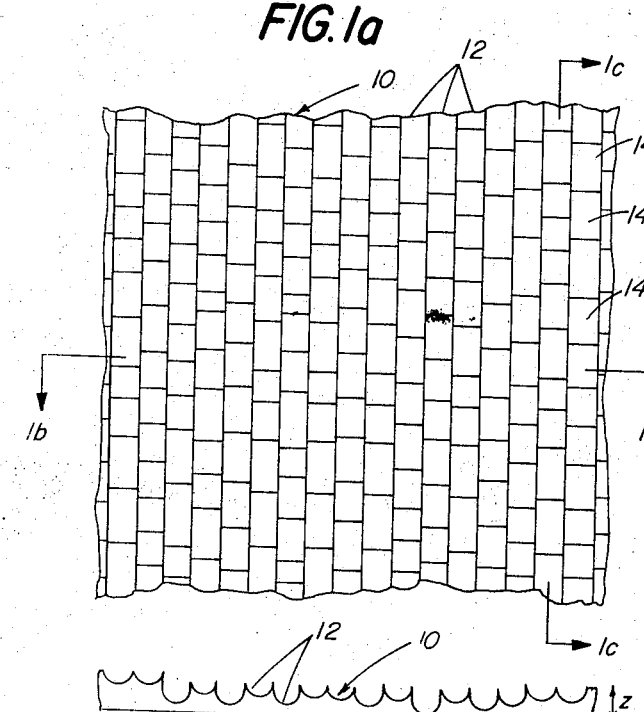
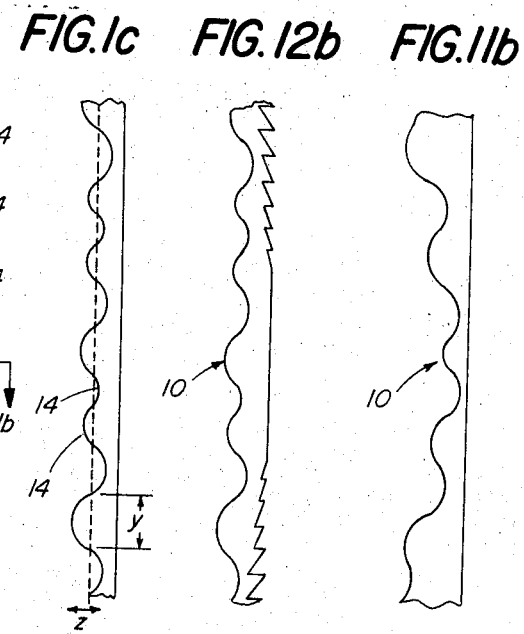
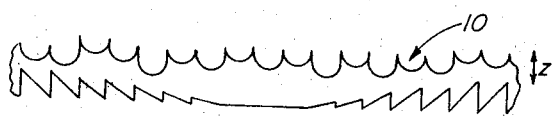
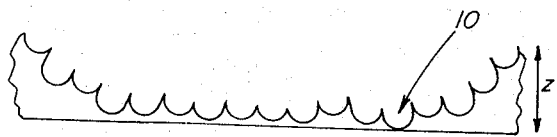
FIG. 1a  FIG. 1c  FIG. 12b  FIG. 11b
FIG. 1b
FIG. 12a
FIG. 11a

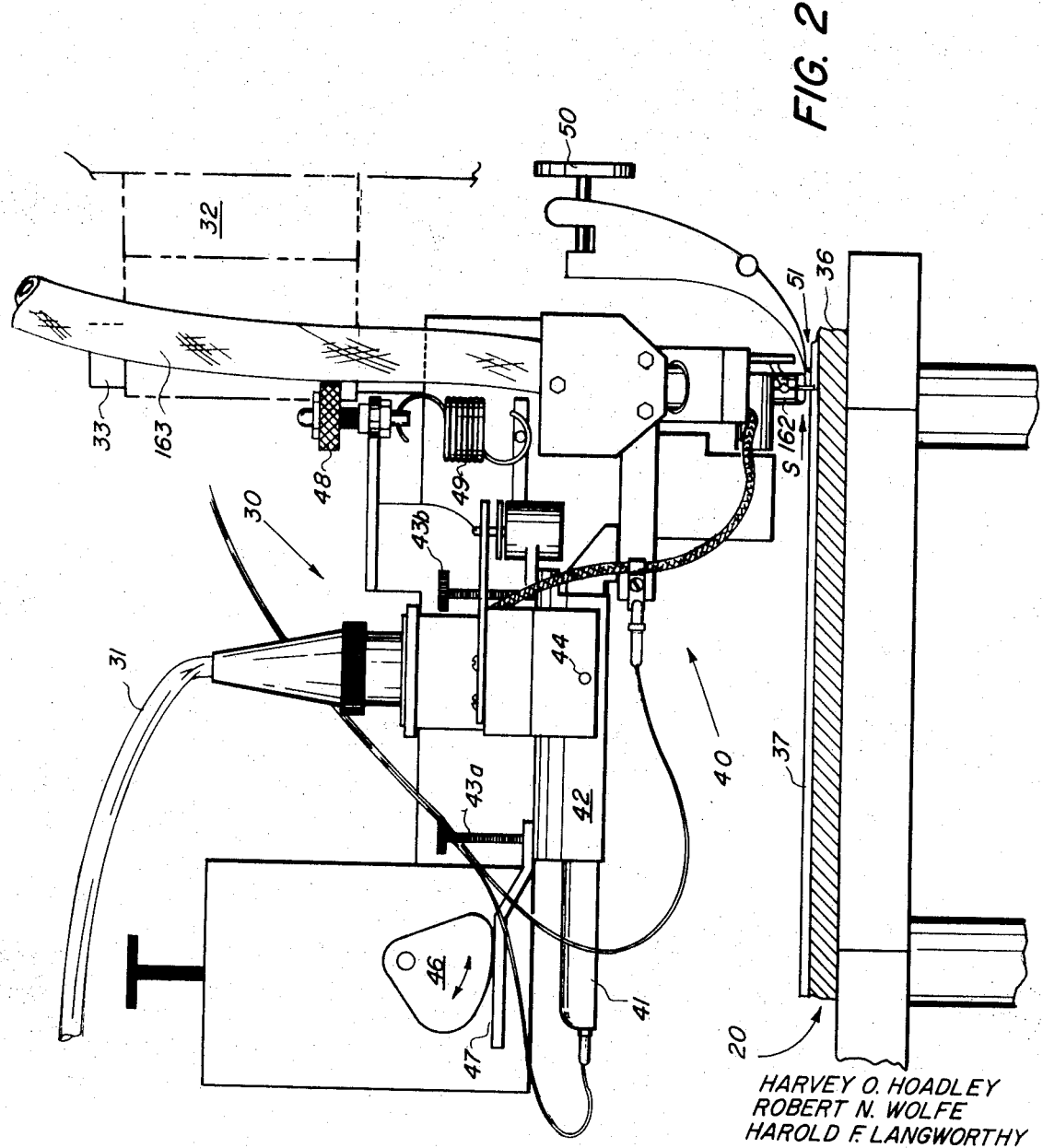

DIRECTION OF TRAVEL OF WORKPIECE

HARVEY O. HOADLEY
ROBERT N. WOLFE
HAROLD F. LANGWORTHY
JAMES J. DePALMA
INVENTORS

BY

*Warren W. Kurz*
ATTORNEY

HARVEY O. HOADLEY
ROBERT N. WOLFE
HAROLD F. LANGWORTHY
JAMES J. DePALMA
INVENTORS

BY *Warren W. Kurz*
ATTORNEY

HARVEY O. HOADLEY
ROBERT N. WOLFE
HAROLD F. LANGWORTHY
JAMES J. De PALMA
INVENTORS

PROJECTION SCREEN

CROSS REFERENCE TO RELATED APPLICATIONS

Reference is made to the commonly assigned co-pending applications, Ser. No. 207,383, entitled "Projection Screen Fabricating Apparatus and Method;" and Ser. No. 207,082, entitled "Radiation-Redistributive Devices," both filed concurrently herewith.

BACKGROUND OF THE INVENTION

The present invention relates to front and rear-projection screens of the type comprising a multitude of contiguous optical microelements, each of which is specially contoured to distribute image flux so as to produce substantially constant luminance throughout a predefined solid audience angle. More particularly, the present invention relates to improvements in such screens, specifically, the aesthetic appearance thereof.

In the above-referenced application Ser. No. 207,082, projection screens and other radiation-redistributive devices are disclosed having radiation-redistributing surfaces which comprise a plurality of contiguous grooves. The depth of each of such grooves undulates in a periodic manner along the groove length in accordance with a predetermined waveform to define a row of optical microelements which alternate from concave to convex in shape. Each microelement is substantially identical in size, whether concave or convex, each having a contour such as to redistribute incident image flux in such a manner as to produce substantially constant luminance throughout predefined horizontal and vertical audience angles. Also disclosed in the same application is a method for fabricating such a screen surface. Briefly, the method comprises cutting the grooves in the surface of a screen blank with the stylus of a sound-recording head while electronically modulating the cutting position of the stylus with an electrical signal of such waveform as to produce the groove depth profile desired.

While the projection screens described in the above application perform quite satisfactorily in distributing image flux, it has been found that the appearance of such screen is not, when viewed in normal room illumination, aesthetically pleasing when manufactured in accordance with the method disclosed. Ideally, the undulation representing the depth profile of each groove should be perfectly in phase with that of all other grooves. However, since the grooves are necessarily cut in a sequential manner, the workpiece from which the projection screen is fabricated being moved past the cutting stylus in a series of equally spaced parallel traverses, it is exceptionally difficult, due to minute variations in the velocity of the workpiece and minute variations in the frequency of the signal used to modulate the cutting stylus, to maintain the ideal phase relationship from one groove to another. As a result of such minute variations, the screen surface exhibits random streaks of light and dark areas running parallel to the grooves which are unpleasing to the eye. Also, the array of small uniformly-sized microelements may give rise to diffraction fringes, which, in turn, may cause a microelement to appear lighter or darker than it should, depending on the specific point in tha audience space from which it is viewed, or even introduce color where there should be none.

SUMMARY OF THE INVENTION

Accordingly, it is an object of the present invention to provide a highly efficient and directional projection screen of improved aesthetic qualities.

Another object of the invention is to improve the aesthetic appearance of projection screens, the image-light-distributing surfaces of which comprise a multitude of optical microelements, each of which is contoured to distribute image flux in such a manner as to produce substantially constant luminance throughout a predefined solid audience angle.

In accordance with the present invention, the above objects are achieved by the provision of a projection screen, which comprises a plurality of contiguous optical microelements of random size but of similar image flux-distributing contour. A screen surface comprising randomly-sized microelements of common shape has been found to exhibit a velvet-like appearance under normal room light, one quite pleasing to the eye. Such a screen surface is fabricated by applying an appropriate electrical signal to the cutting stylus of a sound-recording head during the groove-cutting operation of the screen or screen master. To provide the appropriate electrical signal, circuitry is provided for frequency modulating the stylus driving signal with a noise signal, thereby producing optical microelements which vary randomly in length along the groove length, and for varying the amplitude of the frequency-modulated signal in such a manner that the depth (or height) of each microelement remains proportional to the element length so that each microelement, regardless of size, distributes incident image flux throughout the same solid angle (i.e., has the same optical power) as all other microelements.

Other objects of the invention and its various advantages will become immediately apparent to those skilled in the art from the ensuing detailed description of preferred embodiments, reference being made to the accompanying drawings.

BRIEF DESCRIPTION OF THE DRAWINGS

FIG. 1a is a magnified plan view schematically illustrating a projection screen surface structured in accordance with the present invention;

FIGS. 1b and 1c are transverse and longitudinal cross sections of the screen illustrated in FIG. 1, such cross sections being taken along the lines 1b — 1b and 1c — 1c, respectively;

FIG. 2 is a side elevational view illustrating a portion of the groove-cutting apparatus used to fabricate screen masters for producing screens in accordance with the present invention;

FIGS. 11a, 11b, 12a and 12b illustrate alternative transverse and longitudinal cross sections of the screen illustrated in FIG. 1a; and FIG. 13 is a photograph comparing a projection screen surface structured and fabricated in accordance with the present invention with a screen surface structured and fabricated in accordance with the disclosure of the above-referenced application Ser. No. 207,082.

DETAILED DESCRIPTION OF PREFERRED EMBODIMENTS

Figure 3:
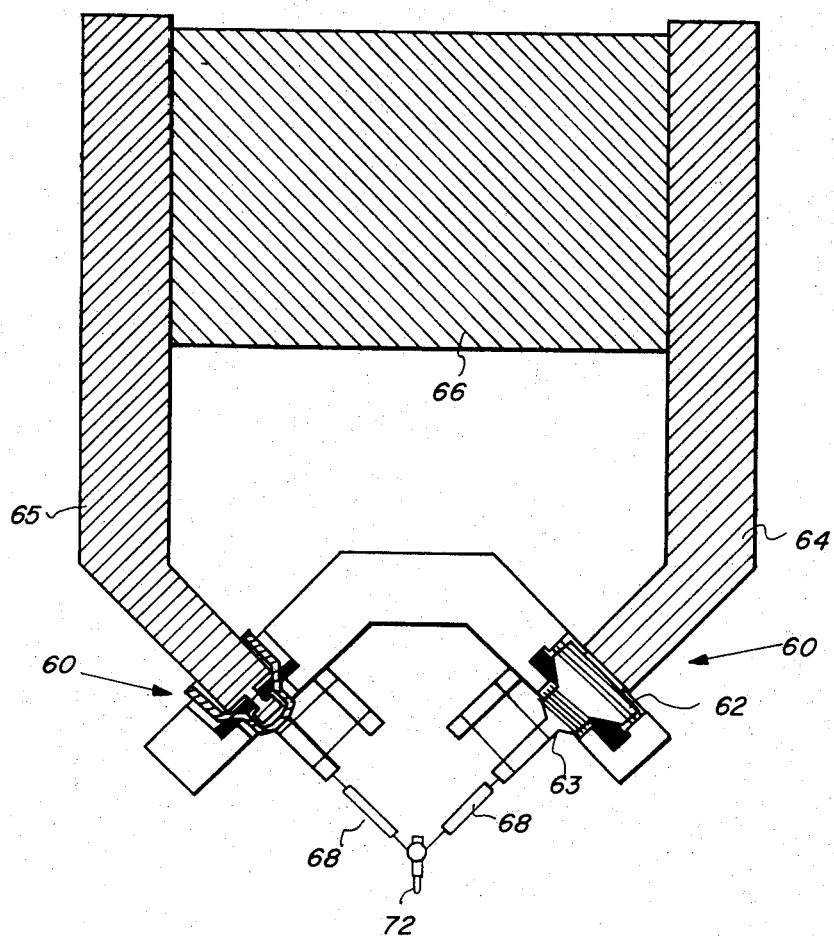
FIG. 3 is a constructional front elevational view of a portion of a stereo sound-recording head used for cutting screen masters.

In FIGS. 1a – 1c, a projection screen structured in accordance with the present invention is shown to comprise a surface 10 in which contiguous rectilinear grooves 12 are cut. Grooves 12 are generally concave in transverse cross section, as best shown in FIG. 1b, and the depth thereof vary along the groove length at a somewhat random spatial frequency to produce a longitudinal cross section such as shown in FIG. 1c. As the groove depth undulates, alternately concave and convex optical microelements 14 are formed, such microelements having a substantially rectangular shape in the plane of the screen. Because the spatial frequency of the groove depth undulation varies randomly, within a predefined spatial frequency range, the size of the microelements (more specifically the microelement length y) varies accordingly. Preferably, all microelements are of a size which is too small to be resolved by the closest intended viewer, and each is of a size within ±20 percent of a mean size. The depth z of each microelement is proportional to the length thereof, so that all microelements regardless of size have substantially identical optical power. Moreover, each microelement is contoured to produce substantially constant luminance within a predefined viewing space, as discussed below.

As indicated in the above-referenced application, the transverse and longitudinal cross sections of a convex microelement which is contoured to redistribute normally incident image flux in such a manner as to produce uniform luminance throughout an audience space bounded by viewing angles A and B (measured from the normal to the microelement in the plane of the cross section and substantially zero luminance elsewhere, must be substantially defined by at least a segment of the curve $$u = \pm f(w;n) = \pm( \sqrt{1-w}( \sqrt{w} -2n) + \cos^{-1} \sqrt{w}) \quad (1)$$

where $n$ is the refractive index of the microelement ($n$ being $-1$ in the case where the microelement is reflective); $u$ and $w$ are the microelement coordinates, $w$ being measured in a direction parallel to the path of incident image light, and $u$ being measured in the plane of the cross section, perpendicular to $w$; and $w$ has a value within the following limits:

$\cos^2 A \leq w \leq 1$, when $f(w;n)$ is positive and the microelement is refractive and when $f(w;n)$ is negative and the microelement is reflective; and $\cos^2 B \leq w \leq 1$, when $f(w;n)$ is negative and the microelement is refractive and when $f(w;n)$ is positive and the microelement is reflective.

Similarly, the transverse and longitudinal cross sections of a concave microelement must be substantially defined by at least a segment of the curve $$u = \pm g(w;n) = \pm( \sqrt{1+w}( \sqrt{-w}-2n) + \cos^{-1} \sqrt{-w}) \quad (2)$$

wherein $w$ has a value within the following limits:

$-1 \leq w \leq -\cos^2 B$, when $g(w;n)$ is positive and the microelement is refractive and when $g(w;n)$ is negative and the microelement is reflective; and $-1 \leq w \leq -\cos^2 A$, when $g(w;n)$ is negative and the microelement is refractive and when $g(w;n)$ is positive and the microelement is reflective.

To fabricate projection screws having a light-distributing surface similar in appearance to that illustrated by surface, various equipment and techniques conventionally employed in the sound recording industry are employed. In FIG. 2, a side elevation of the screen master cutting apparatus is shown in a cutting position relative to a screen blank 20 wherein the microelements are to be formed. While the microelements can be cut directly in any readily workable material which itself can be used as the projection screen, the preferred method of manufacture comprises the fabrication of a screen master in some workable material, such as acetate or wax, from which a negative matrix or press tool of correct contour can be subsequently made. The negative matrix can then be used to produce a multitude of positive projection screens by well-known and economical duplicating processes, such as injection molding, embossing, pressing, or the like.

As shown in FIG. 2, the cutting apparatus comprises a conventional stereo sound-recording head 30 which includes a cutting stylus S. While a monaural sound-recording head could be used, a stereo head is preferred due to the high quality of auxiliary equipment available for conventional stereo heads. As in all sound recording heads, the cutting position of the stylus is determined by the waveform of an electrical signal applied to the recording head, such as through input cables 31. The recording head is mounted on a milling machine tool holder 32 by a cylindrical fitting 33. Means are provided for controlling the vertical position of fitting 33 in the tool holder 32 so as to provide a coarse, vertical adjustment of the recording head 30 above the screen blank. The screen blank may comprise, for instance, an aluminum plate 36 having an acetate coating 37, the thickness of which is sufficient to receive the contours of the projection screen surface. Recording head 30 comprises a cutting assembly 40 having a horizontally extending support arm 41 which is slidably mounted on precision ways disposed in a saddle 42. By this arrangement, the horizontal position of cutting assembly 40 can be varied. Set screws 43a and 43b serve to lock arm 41 in a desired horizontal position. Saddle 42 is pivotally mounted about pin 44 disposed on recording head 30 so that the cutting stylus S, which forms a part of cutting assembly 40, can be pivoted into engagement with the screen blank. The pivotal movement of a cam 46 serves to raise and lower the stylus relative to the screen blank surface by contacting an arm 47 which is rigidly coupled with saddle 42. The cutting force applied to the stylus is controlled by screw 48 which serves to adjust the tension in spring 49. The precise depth of cut is controlled by adjustment screw 50 which varies the vertical distance of the stylus tip from a small glass ball follower 51 which rides on the uncut surface of the screen blank a short, horizontal distance away from the stylus.

A sound recording head which has been found particularly well adapted for cutting projection screen masters is the Westrex Corporation, Model 3D StereoDisc. As illustrated in FIG. 3, wherein a simplified constructional diagram of the mechanism which controls stylus movement is shown, each recording channel of the stereo recording head contains a magnetic coil form assembly 60, each of which contains a driving coil 62 located in separate pole pieces 64 and 65 which are attached to a single magnet 66.

The coil assemblies are attached to the stylus holder through links 68 which are stiff longitudinally, but flexible laterally. These links are braced in the center to prevent excessive lateral compliance. This structure results in a stiff, forward driving system with a high compliance in the lateral direction.

Figure 4:
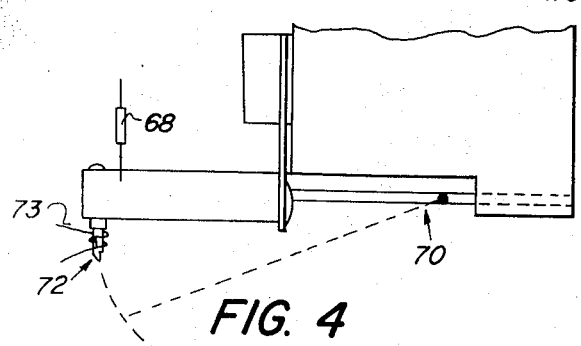
FIG. 4 is a side view of the cutting stylus of the recording head of FIG. 3, illustrating the stylus support.

The supporting member for the stylus is shown in FIG. 4. The use of a cantilever spring 70 permits the stylus to present a uniform impedance to complex motions in any direction in the vertical plane.

The cutting tip 72 of stylus S has a profile which is designed to conform with the desired transverse cross section of the screen elements, such as that defined by Equations (1) or (2) above. To assist in cutting the workpiece with the requisite accuracy and smoothness of finish, the stylus is heated by heating coil 73 to a temperature such as to soften adequately the acetate coating of the screen blank.

Figure 5:
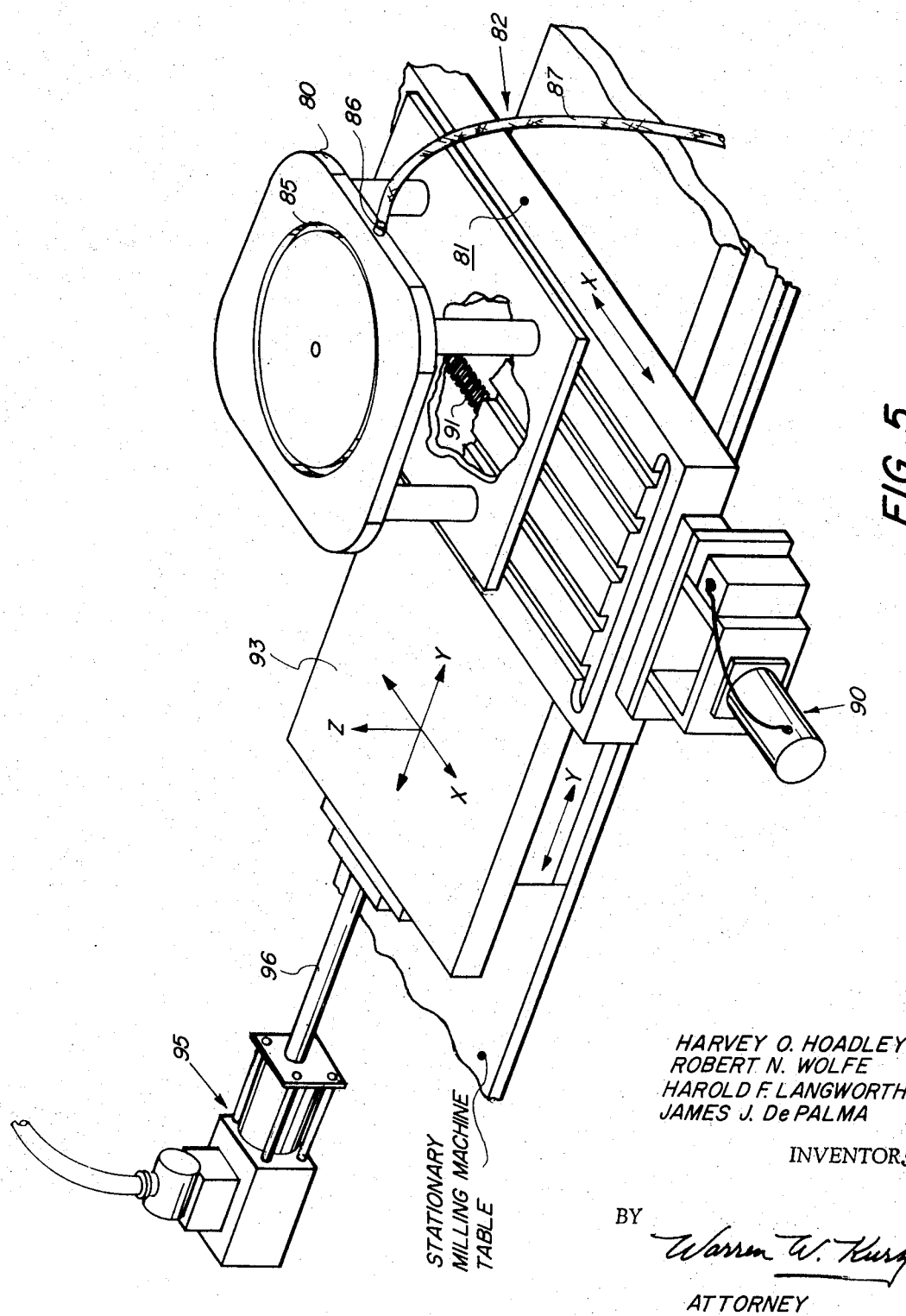
FIG. 5 is a perspective view of apparatus adapted to translate a blank projection screen master relative to the screen-cutting apparatus depicted in FIG. 2.

In fabricating projection screen masters by use of the apparatus described above, the screen blank is moved relative to the heated cutting stylus in a series of equally spaced, parallel traverses. At the same time, the cutting position of the stylus is electronically varied relative to the workpiece to produce the desired longitudinal cross section or depth profile. Apparatus for moving the workpiece relative to the stylus is depicted in FIG. 5. During the cutting operation, screen blank 20 is supported by a table 80 which is preferably fabricated from a non-magnetic metal, such a aluminum, so as not to interfere with the magnetic cutting assembly 40. In the upper surface of table 80, a circular groove 85 is provided. At the base of groove 85 is an opening (not shown) which communicates with a nozzle 86 located on the edge of the table. Attached to nozzle 86 via hose 87 is a vacuum source (not shown). By this arrangement, the screen blank is securely fastened to the surface of table 80 by a vacuum coupling. Table 80 is mechanically secured to a movable workbed 88 which comprises the x-y table 89 of a milling machine. Workbed 88 is movable in the x direction and its position is controlled with precision by a conventional stepping motor 90 which acts through lead screw 91. Workbed 88 itself rides atop a movable carriage 93, also forming a part of the milling machine carriage. Carriage 93 is movable in the y direction by a hydraulic pneumatic motor 95 which precisely controls the rate at which the table moves via piston rod 96.

Figure 6:
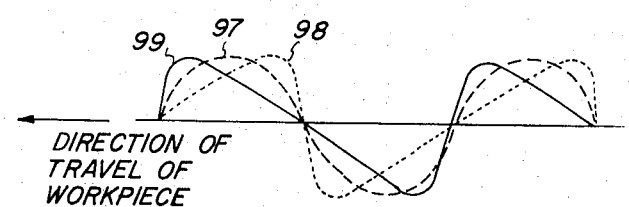
FIG. 6 illustrates the manner in which the waveform of the stylus driving signal differs from the stylus motion produced thereby.

To move the cutting stylus only in a vertical plane and at a rate which, when the workpiece is moved at a constant rate relative thereto, results in the longitudinal cross section or depth profile desired, the same signal must be applied, 180° out of phase, to both drive coils 62 of the cutting assembly. Moreover, since the stylus is not mounted for vertical movement, but rather for pivotal movement on the cantilever spring 70 so as to traverse an arcuate path as shown in phantom lines in FIG. 4, it is necessary to drive the stylus with a somewhat different waveform than that which corresponds to the longitudinal cross section desired. Referring to FIG. 6, when a waveform 97 is applied to the cutting stylus, the resulting groove has a depth profile as shown in the asymmetrical waveform 98. To compensate for the asymmetry, it is necessary to drive the cutting stylus with a counterbalancing asymmetrical waveform 99 which the arcuate stylus movement converts to the depth profile desired (e.g., waveform 97). It is interesting to note that in the sound recording art, such asymmetry is automatically compensated for during playback by the pickup stylus which is also pivotally mounted and, hence, moves along an arcuate path similar to that along which the stylus which cut the original master recording moved. In achieving a desired profile for projection screens, however, such asymmetry must be compensated for by appropriate circuitry.

Figure 7:
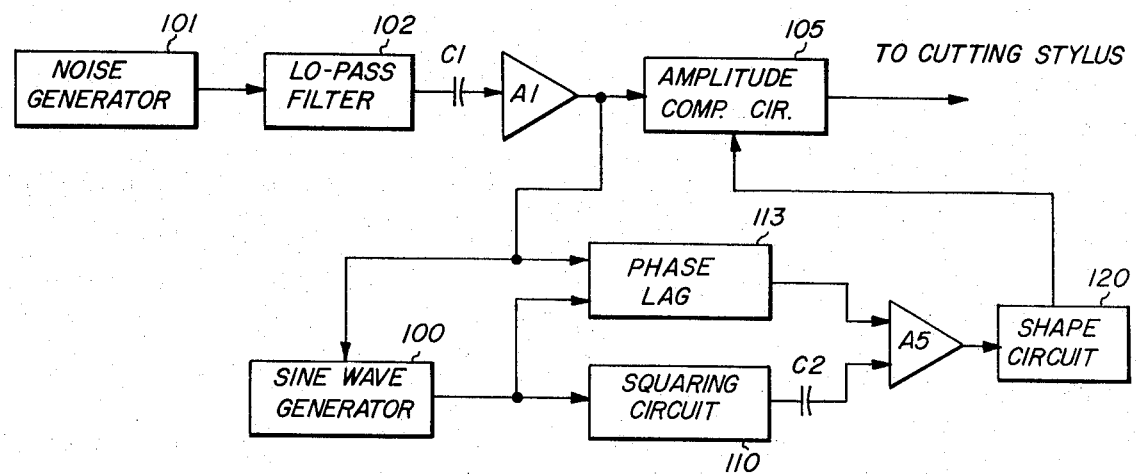
FIG. 7 is a block diagram of circuitry adapted to drive the cutting stylus of a sound recording head to FIG. 8 is an electrical schematic of the phase lagging circuit of FIG. 7.

In FIG. 7, preferred circuitry for driving the cutting stylus in such a manner as to randomly vary the size of the microelements cut thereby, without disturbing the ability of such elements to distribute image light uniformly throughout a common solid audience angle, is illustrated in block diagram form. Speaking in terms of Fourier analysis, the signal applied to the driving coils of the cutting stylus to produce grooves having a depth profile defined by the equations above is rich in harmonics. Therefore, if the signal is to pass with undistorted shape through the audio amplifier of the recording head, its fundamental frequency must lie near the lower end of the flat part of the pass-band of the amplifier, but not so low as to become subject to the phase distortion associated with the low-frequency cutoff characteristic. For this reason, the median frequency of the wave generator 100 used to generate the basic sinusoidal waveform from which the stylus driving signal is ultimately derived was chosen to be 200 Hz, and it follows then that the length of the microelements is determined by the rate at which the screen blank is moved in y-direction past the cutting stylus. In order to randomly vary the size of each microelement by ± 20 percent of a mean size, the frequency of the signal applied to the cutting stylus must be randomly varied by ± 20 percent about 200 Hz, or from 160 to 240 Hz. To produce such random variation, the output of the sine wave generator 100 is frequency modulated by a noise signal. Such a noise signal is provided by a conventional noise generator 101, the output of which is fed through a low-pass filter 102 having a cutoff frequency of about 20 Hz. The dc component of the noise signal is eliminated by capacitor C1. The amplitude of the noise generator 101 is set so that the frequency excursions of the cutting signal are contained almost entirely within the limits of ± 20 percent of the center frequency of 200 Hz. After passing through a buffer amplifier A1, the low frequency noise is applied to the sine wave generator. Generator 100 is of the type which provides an output frequency based upon the amplitude of an input voltage.

If the frequency of the cutting signal were altered while the amplitude thereof remained constant, the contour of each microelement would vary along the groove length, and each microelement would distribute image light over solid audience angles determined by its particular contour. In order to maintain the optical power of each microelement constant, regardless of its size, it is necessary to change the amplitude of the cutting signal in concert with its frequency, in such a manner that the amplitude is always proportional to the wavelength of the cut, or inversely proportional to the cutting-signal frequency. This implies that the cutting-signal amplitude must be under the control of the same modulating (noise) signal that frequency-modulates the output of generator 100. Thus, the output of the noise generator is also applied to an amplitude compensation circuit 105, described in detail hereinbelow.

As indicated above, in order to drive the cutting stylus in such a manner as to cut symmetrical microelements along the groove length, it is necessary to apply an asymmetrically distorted waveform to the driving coils of the cutting stylus which, due to the arcuate movement of the stylus, is converted into the desired groove-cutting stylus movement. It has been found that the required asymmetry can be substantially achieved by adding to the sinusoidal output of generator 100 a small amount of its second harmonic, in phase with the fundamental frequency. A conventional squaring circuit 110, comprising an analog multiplier module having the same signal applied to both inputs, is used to generate the second harmonic waveform (sin $2x$) from the fundamental. Capacitor C2 serves to eliminate the dc component of the output of circuit 110 which is (sin $x$)$^2$. Since the midpoint of the resulting waveform lags the sin $x$ waveform by 45°, it is necessary to feed the output of the wave generator through a phase-lagging circuit 113 before combining it with the second harmonic signal in summing operational amplifier A5. The output of the summing amplifier A5 is then fed through a shaping circuit 120 which converts the asymmetrical output of the summing amplifier A5 to the asymmetrical waveform required to drive the cutting stylus. The output of the shaping circuit 120 is then fed to the amplitude compensating circuit which acts to vary the amplitude of the shaping circuit output to a level inversely proportional to its instantaneous frequency. The output of the amplitude compensation circuit 105 is then applied to both input channels of the stereo sound-recording amplifier.

When the output frequency of generator 100 is constant, the phase lag of 45° which is required of circuit 113 can be accomplished by a simple RC circuit. However, when the output of generator 100 is frequency modulated, such as by the noise generator 101, the reactance of the capacitor varies with the instantaneous frequency, according to the formula $X_c = \frac{1}{2}\pi fC$. This means that, as the frequency varies, both the phase lag and the amplitude of the output vary. To solve this problem, a constant reactance phase-lagging circuit was devised, such circuit being illustrated schematically in FIG. 8.

Figure 8:
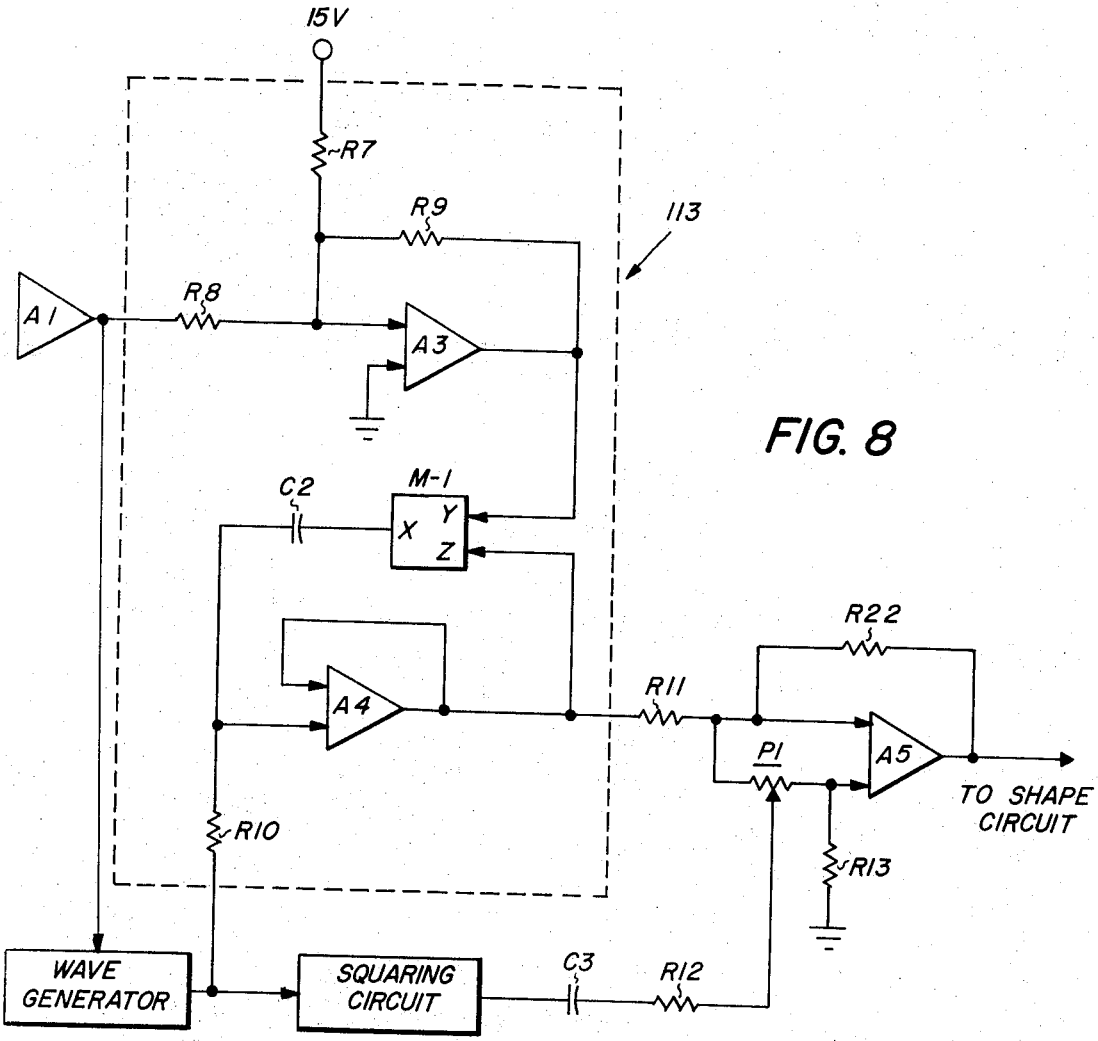

As mentioned hereinbefore, the output frequency of wave generator 100 varies in accordance with the noise voltage $v_n$ from amplifier A1. As shown in FIG. 8, the output of the wave generator is applied to the phase-lag circuit which comprises resistor R10 and capacitor C2. Operational amplifier A4 is a high-input-impedance unity-gain isolation amplifier which ensures that the action of the phase-lag circuit is not altered by reason of being loaded by resistor R11 and the input impedance at terminal Z of module M–1. Module M–1 is an analog divider, which acts as an amplifier having a voltage gain, from Z to X, which can be varied under the control of an electrical signal applied to terminal Y.

Connected as shown in FIG. 8, module M–1 causes the effective value of capacitor C2 to be larger than its actual value. Varying the gain of Module M–1 results in a corresponding change in the effective value of the capacitance of C1. The gain-control signal for Module M–1 is obtained by adding a constant voltage to the modulating noise voltage in operational amplifier A3. In the preferred embodiment, resistors R7, R8, and R9 are selected to make the output of amplifier A3 approximately $-(3 + 3.9\ v_n)$ volts, when the instantaneous frequency of the wave generator is 200 $(1 + v_n)$ Hz.

In accordance with the FIG. 8 circuit, the effective value of the capacitance is varied in concert with the output frequency of the wave generator in such a manner that the effective reactance $X_c$ of capacitor C2 has a maximum change of only 1.6 percent while $v_n$ varies over the range of $\pm 0.2$ volts, and the output frequency of wave generator 100 varies between 160 and 240 Hz. An uncompensated capacitor would change its reactance over a total range of 41.7 percent of its median value for the same frequency changes. Thus, the effect of the constant reactance circuit of FIG. 8 is to hold both the phase shift and the amplitude of the output of amplifier A4 substantially constant while the wave generator frequency varies under the influence of the noise voltage. To vary the amount of second harmonic added to or subtracted from the output of amplifier A4, a potentiometer P1 is connected as shown.

Figure 10:
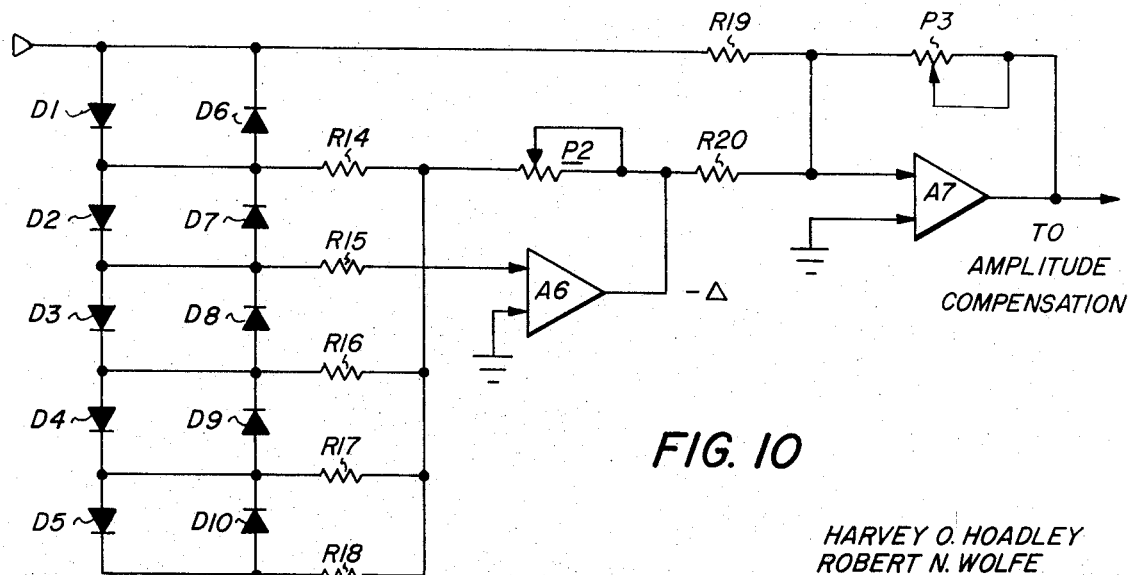
FIG. 10 is an electrical schematic of the shaping circuit illustrated in FIG. 7.

To produce the desired waveform from the asymmetrically distorted sine wave output of summing amplifier A5, output of the amplifier is fed to the shaping circuit 120. As shown in FIG. 10, this input signal is segmented by reason of having to overcome successively the forward voltage drops across diodes D1–D10. Diodes D1–D5 and D6–D10 serve to segment the positive- and negative-going portions of the input signal, respectively. Operational amplifier A6 serves to sum the contributions of the various segments to produce a difference signal $\Delta x$ having a waveform representing the difference by which the desired waveform [Equation (2) plus distortion] differs from the asymmetrically distorted sine wave. The contributions of the individual segments to the output of amplifier A6 are adjusted by varying the values of resistors R14–R18. The output of amplifier A6 is adjustable in amplitude by potentiometer P2. Resistors R19 and R20 and potentiometer P2 serve to control the gain of amplifier A7. By simply adding the difference signal $\Delta x$, which is of a polarity opposite that of the unshaped signal due to the polarity reversing affect of amplifier A6, to the unshaped signal, the desired waveform for driving the cutting stylus is achieved. Such addition is performed by operational amplifier A7. Resistors R19, R20 and R21 serve to control the gain provided by the summing amplifier A7. The output of amplifier A7 is then fed to the input to the analog divider module M–3 of the amplitude compensation circuit.

Figure 9:
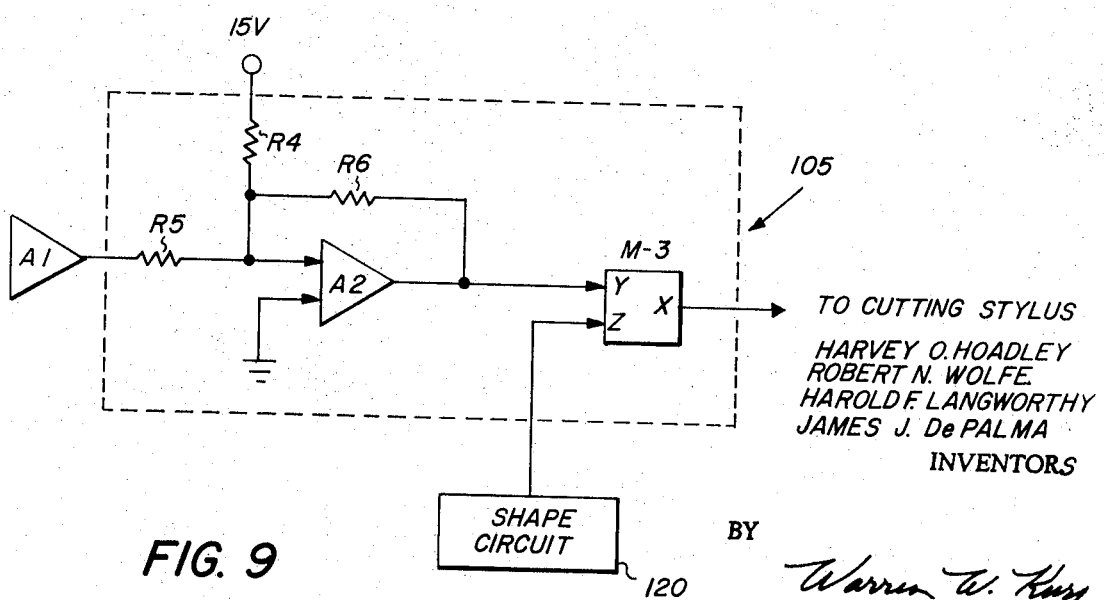
FIG. 9 is an electrical schematic of the amplitude compensation circuit of FIG. 7.

In order for the cutting stylus to cut microelements of random size but of similar contour, it is necessary to vary the amplitude of the variable-frequency output of shaping circuit 120 so that the product of amplitude and frequency is substantially constant. As shown in FIG. 9, the output of shaping circuit 120 is fed to input terminal Z of an analog divider module M–3. Output X of the module M–3 is proportional to Z/Y. The noise voltage $v_n$ from buffer amplifier A1 is fed to operational amplifier A2 which adds a constant voltage to it so that the output of amplifier A2 is proportional to $-(1 + v_n)$ and therefore also proportional to the instantaneous frequency of the wave generator. The output of amplifier A2 is then fed to input terminal Y of module M–3 which serves to divide the instantaneous amplitudes of the input signals so as to provide an output, the amplitude of which is inversely proportional to frequency. The frequency applied to terminal Z increases, as the amplitude of the signal (of negative polarity) applied to terminal Y increases.

Listed below are preferred values of the various circuit elements comprising the circuits illustrated in FIGS. 7–10.

$R_1$ — 10 K ohms
$R_2$ — 1 megohms
$R_3$ — 6.8 K ohms
$R_4$ — 0.15 megohms
$R_5$ — 10 K ohms
$R_6$ — 47.5 K ohms
$R_7$ — 0.475 megohms
$R_8$ — 24.4 K ohms
$R_9$ — 94.8 K ohms
$R_{10}$ — 18 K ohms
$R_{11}$ — 0.10 megohms
$R_{12}$ — 0.10 megohms
$R_{13}$ — 0.10 megohms
$R_{14}$ — 22 K ohms
$R_{15}$ — 47 K ohms
$R_{16}$ — 68 K ohms
$R_{17}$ — 39 K ohms
$R_{18}$ — 100 K ohms
$R_{19}$ — 5.6 K ohms
$R_{20}$ — 5.6 K ohms
$R_{21}$ — 10 K ohms
$R_{22}$ — 0.10 megohms
$P_1$ — 10 K ohms
$P_2$ — 10 K ohms
C1 — 10 µf
C2 — 0.01 µf
C3 — 10 µf To initiate the cutting operation, a start button is pressed which pivots the cutting assembly 40 about pin 44 into a cutting position, causes the hydraulic-pneumatic motor 95 to move the milling machine carriage in the y direction and causes the above-described electronic circuitry to drive the cutting stylus according to the waveform of the electrical signal applied thereto. After cutting a groove of predetermined length, a microswitch (not shown) is actuated by the table 93 which serves to stop pneumatic motor 95, activate a solenoid which moves cam 46 of the recording head clockwise into a position to pivot the cutting assembly into an inoperative position, and actuate stepping motor 90 so as to move the screen blank a predetermined distance in the x direction. The microswitch also returns the milling machine carriage to its starting position on the y-axis which, in turn, actuates a second microswitch. When actuated, the second microswitch rotates cam 46 counterclockwise to permit the recording head to pivot into an operable cutting position, and the cutting process is repeated. This process continues without interruption until the entire screen master has been cut.

As the heated stylus S cuts a groove in the screen blank, a continuous sliver or chip is extricated from the screen blank surface. To continuously draw this sliver away from the screen blank, a vacuum nozzle 162 (shown in FIG. 2) connected to a vacuum source through hose 163, is positioned adjacent stylus S during the cutting operation.

After making the projection screen master in accordance with the afore-described method and apparatus, projection screens can be produced therefrom by making a negative matrix or master from the original, and casting positive screens, in a resinous material, from the negative matrix. Preferably, the negative matrix is made from General Electric RTV–60 silicone rubber which is prepared by adding three grams of dibutyl tin dilaurate RTV curing catalyst to two pounds of the RTV–60 rubber, agitating the mixture with an electric stirrer for five minutes and placing it in a bell jar which is then evacuated to a pressure of 150 microns of mercury for about 20 minutes. Upon fixing sidewalls to the edge of the original master, the RTV rubber mixture is poured into this mold. After curing, the rubber mold can then be used to cast positive projection screens.

The apparatus and methods set forth above are designed to produce planar projection screen surfaces comprising contiguous optical microelements which, while being of a random size within a predefined size range (determined by the amplitude of the noise voltage), are of substantially identical contour. Moreover, the orientation of each of the microelements is such that its optical axis is substantially parallel to the axes of all other microelements. By controlling the angle at which incoming image-light impinges on each microelement, such as by cylindrically or spherically curving the image light-redistributing surface 10 (See FIGS. 11a and 11b) or by using surface 10 in conjunction with a Fresnel-like lens, as shown in FIGS. 12a and 12b, screen efficiency can be substantially enhanced. Since the solid angle through which each microelement redistributes image-light is a function of its angle of incidence on the microelement surface, proper selection on the angle of incidence can be used as a means for directing the redistributed image-light from each microelement toward the audience space.

To fabricate curved projection screens from masters having planar surfaces, the aforementioned rubber negative mold can be placed on the surface of a spherical or cylindrical section of desired radius of curvature prior to casting. A Maraglas epoxy resin, after being degassed, can then be poured into the mold. After heating in an oven at 200° F for several hours to harden the resin, the casting can be coated with an aluminum coating to form a front projection screen.

To fabricate rear projection screens employing a Fresnel-type lens to control the angle of incidence of image flux on each microelement, a separate Fresnel lens can be either laminated or otherwise affixed to the rear surface of the cast projection screens or, embossed directly on the rear surface, as shown in FIGS. 12a and 12b.

The photograph of FIG. 13 compares the surface appearance of the projection screen of the invention (surface 10) with that of a projection screen produced by the process disclosed in U.S. Application Ser. No. 207,082, such screen surface being generally designated by the reference numeral 13. Like surface 10, surface 13 comprises a multitude of rectilinear grooves, each having a depth which undulates to define a row of alternately concave and convex optical microelements, all being of substantially identical optical power. Unlike surface 10, however, the depth of the grooves of surface 13 undulate at a substantially constant spatial frequency, thereby defining optical microelements of substantially equal size. As indicated previously, a surface comprising rectilinear rows of equi-sized microelements tends to exhibit diffraction effects. Also, when the phase relationship between the microelements of adjacent rows varies only slightly from row to row, the surface exhibits a somewhat streaky appearance, as is evident in the photograph. While such diffraction effects and phase variations have been found to produce substantially no adverse effect on screen performance, they have been deemed unpleasant from an aesthetic viewpoint.

In contrast, screen surface 10 exhibits a textured or velvet-like appearance. The streakiness characteristic of surface 13 is all but eliminated by virtue of the randomized microelement size. The improvement in aesthetic quality is readily apparent.

This invention has been described in detail with particular reference to preferred embodiments thereof, but it will be understood that variations and modifications can be effected within the spirit and scope of the invention.

We claim:

1. In a projection screen comprising means defining a plurality of contiguous optical microelements arranged in rectilinear rows, each of such microelements being adapted to redistribute incident image flux throughout a predefined audience volume, the improvement wherein said microelements randomly vary in size, within a predefined size range, and are of substantially identical optical power.

2. The invention according to claim 1 wherein the size of all microelements is within $\pm$ 20 percent of a mean size.

3. The invention according to claim 1 wherein said optical microelements are alternately concave and convex in shape along said rows.

4. The invention according to claim 1 wherein said microelements are contoured to distribute image flux in such a manner that substantially constant luminance is produced throughout predefined horizontal and vertical audience angles.

5. The invention according to claim 1 wherein said screen surface is cylindrically curved about a line spaced from said screen surface and extending perpendicular to the groove length.

6. The invention according to claim 1 wherein said surface is cylindrically curved about a line remote from the screen surface and extending parallel to the groove length.

7. The invention according to claim 1 wherein said surface is spherically curved to converge the optical axes of all microelements at a point remote from the screen surface.

8. The invention according to claim 1 wherein said surface is reflective to image flux.

9. The invention according to claim 1 wherein said surface is substantially transparent to image flux.

10. In a projection screen surface comprising means defining a plurality of contiguous rectilinear grooves, the depth of each of such grooves varying along the groove length to define a row of contiguous optical microelements, the improvement wherein said groove depth varies along the row at a random spatial frequency, within a predefined spatial frequency range, to define rectilinear rows of contiguous optical microelements which randomly vary in size, within a predefined size range.

11. The invention according to claim 10 wherein said groove depth varies in such a manner that each of said microelements has a height, measured in a direction normal to the screen surface, proportional to the length thereof, measured along the groove length, whereby all microelements have substantially identical optical power.

12. The invention according to claim 10 wherein said groove depth undulates at a random spatial frequency to define rows of alternately concave and convex optical microelements.

13. The invention according to claim 10 wherein the transverse and longitudinal cross sections of each of said grooves is contoured such that each of said microelements redistributes image flux in such a manner that substantially constant luminance is produced throughout a predefined audience volume.

14. In a projection screen having a surface comprising means defining a plurality of contiguous rectilinear grooves, each groove having a depth which undulates along the groove length to define a row of contiguous optical microelements, the improvement wherein said groove depth varies along the groove length at a random spatial frequency, within a predefined spatial frequency range, and in such a manner as to define contiguous optical microelements of random sizes, within a predefined size range, and of substantially identical image flux-distributing power, each of said microelements being contoured to redistribute normally incident image flux throughout a predefined audience space, bounded in a plane transverse to said groove length and normal to said screen surface by audience angles A and B, measured from a normal to said surface, and having a cross section substantially defined by at least a segment of a first curve $$u = \pm g(w;n) = \pm(\sqrt{1+w}\,(\sqrt{-w}-2n) + \cos^{-1}\sqrt{-w})$$

where $n$ is the refractive index of said microelement ($n$ being $-1$ when said microelement is reflective); $u$ and $w$ are the coordinates of said microelement, $w$ being measured in a direction parallel to the path of incident radiation, and $u$ being measured in the plane of the cross section, perpendicular to $w$; and $w$ has a value within the following limits:

$-1 \leq w \leq \cos^2 B$; when $g(w;n)$ is positive and said microelement is refractive and when $g(w;n)$ is negative and said microelement is reflective; and $-1 \leq w \leq \cos^2 A$; when $g(w;n)$ is negative and said microelement is refractive and when $g(w;n)$ is positive and said microelement is reflective, whereby each of said optical microelements produce substantially uniform luminance in said plane between said audience angles.

15. The invention according to claim 14 wherein each of said microelements has a longitudinal cross section substantially defined by at least a segment of said first curve where A and B are measured in the plane of said longitudinal cross section, and by at least a segment of a second curve $$u = \pm f(w;n) = \pm \sqrt{1-w}\,(\sqrt{w} - 2n) + \cos^{-1}\sqrt{w})$$

where $w$ has a value within the following limits:

$\cos^2 A \leq w \leq 1$, when $f(w;n)$ is positive and said microelement is refractive and when $f(w;n)$ is negative and said microelement is reflective; and $\cos^2 B \leq w \leq 1$, when $f(w;n)$ is negative and said microelement is refractive and when $f(w;n)$ is positive and said microelement is reflective.

16. The invention according to claim 14 wherein said surface is substantially spherically curved to converge the optical axes of all microelements at a point remote from said screen surface.

17. In a rear projection screen for presenting an image projected thereon to a predefined audience space, the screen comprising a sheet of substantially transparent material having first and second surfaces extending in substantially parallel planes, the first surface comprising means defining a plurality of contiguous optical microelements for distributing image flux to an audience area, the microelements being arranged in rectilinear rows, the improvement wherein said microelements randomly vary in size, within a predefined size range, and are of substantially identical optical power, and said second surface comprises means defining a Fresnel-type lens for controlling the angle at which image flux impinges upon said microelements.

18. The invention according to claim 17 wherein said optical microelements are alternately concave and convex in shape along said rows.

19. The invention according to claim 17 wherein said microelements are contoured to distribute normally incident image flux in such a manner that substantially constant luminance is produced throughout said audience area.

* * * * *

UNITED STATES PATENT OFFICE
CERTIFICATE OF CORRECTION

Patent No. 3,754,811  Dated August 28, 1973

Inventor(s) Harvey O. Hoadley, Robert N. Wolfe, Harold F. Langworthy, James J. DePalma It is certified that error appears in the above-identified patent and that said Letters Patent are hereby corrected as shown below:

Column 1, line 66, "tha" should read --the--;

Column 4, line 21, "screws" should read --screens--;

Column 4, line 23, "by surface" should be deleted and --in Figs. 1a-1c-- should be added;

Column 9, in the table, "$R_2$ - 1 megohns" should read --$R_2$ - 1 megohms--.

Signed and sealed this 19th day of March 1974.

(SEAL)
Attest:

EDWARD M. FLETCHER, JR.
Attesting Officer

C. MARSHALL DANN
Commissioner of Patents